July 19, 1938.　　　O. E. TRAUTMANN　　　2,124,157

FIELD GLASS

Filed May 21, 1937

OTTO E. TRAUTMANN
INVENTOR.

BY

ATTORNEYS

Patented July 19, 1938

2,124,157

UNITED STATES PATENT OFFICE 2,124,157

FIELD GLASS

Otto E. Trautmann, Irondequoit, N. Y., assignor to Bausch & Lomb Optical Company, Rochester, N. Y., a corporation of New York Application May 21, 1937, Serial No. 144,003

2 Claims. (Cl. 88—34)

The present invention relates to optical instruments and more particularly to field glasses or binoculars.

One of the objects of the present invention is to provide new and improved binoculars or field glasses which are simple and inexpensive to manufacture yet rugged and efficient in operation. Another object is to provide field glasses or binoculars of molded plastic material. A further object is to provide a new binocular or field glass construction in which the focusing mechanism is located within a hollow body of molded plastic material. These and other objects and advantages reside in certain novel features of construction, arrangement and combination of parts as will hereinafter be more fully set forth and pointed out in the appended claims.

Referring to the drawing.

Figure 1:
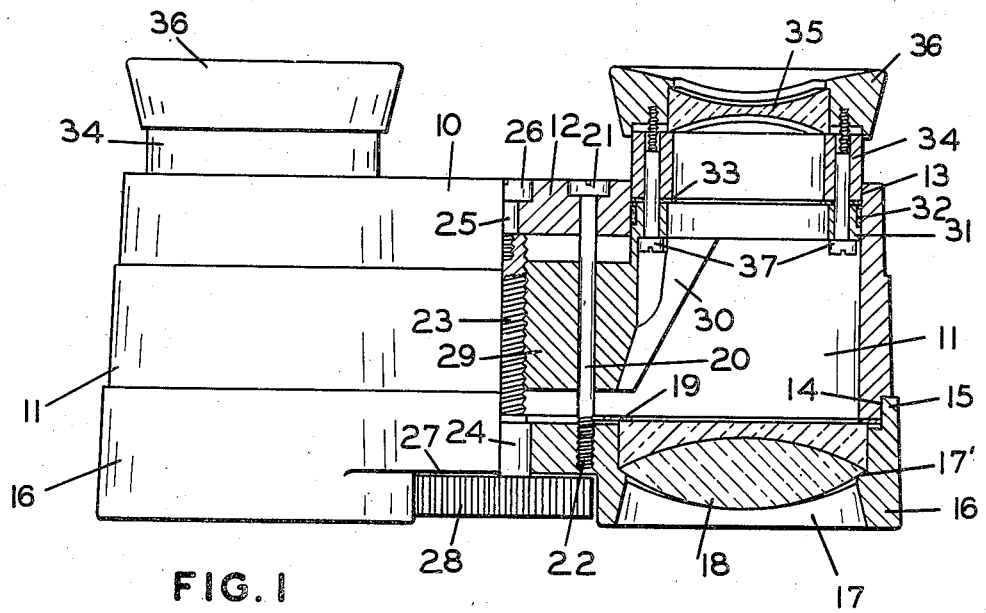
Fig. 1 is a view of my improved field glass showing one half in section and the other half in elevation.
Figure 2:
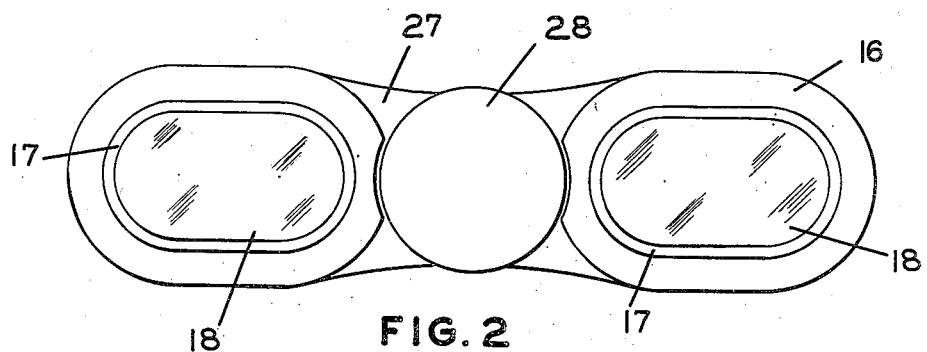
Fig. 2 is a front view of same.

A preferred embodiment of the present invention is illustrated in the drawing wherein 10 designates a hollow body which is preferably molded of a synthetic resin or plastic such as Bakelite or the like. The field glass of the present invention is symmetrical and the body 10 is formed with two barrel portions 11 and a bridge member 12, formed integrally with the body 10, extends across one end of the body between the barrel portions 11 thus forming two openings 13. The front end of the body 10 is open and is provided on the outer surface with a peripheral recess 14 for receiving the flange 15 of a front plate 16.

The front plate 16 is also preferably molded of synthetic plastic or resin, such as Bakelite or the like, and is provided with two apertures 17 in alignment with the barrel portions 11. Each of these apertures 17 has an internal shoulder or flange 17' forming a seat for the lenses 18. Spring washers 19 are placed between the lenses 18 and the front end of the body 10 to insure a close fit between the lenses 18 and the shoulders 17'.

One or more smooth rods 20, each having an enlarged slotted head 21, extend through the bridge member 12 and are provided with a threaded portion 22 which is screwed into the front plate 16 to secure the front plate 16 to the body 10. The rod or rods 20 are parallel to the axes of the barrel portions 11. A screw 23 extends between the bridge member 12 and the front plate 16 and is provided with a smooth bearing portion 24 rotatably journalled in the front plate 16. The rear end of the screw 23 is tapped to receive a bolt 25 which extends through the bridge member 12 and is provided with an enlarged slotted head 26. The central part of the front plate 16 is recessed at 27 and a knurled knob 28, fixed on the end of the screw 23, is located in this recess in such a way that it is readily accessible for operation by the user of the glasses.

A yoke 29 is slidably mounted on the rod or rods 20 within the body 10 and is threaded onto the screw 23. An arm 30 is fixed on each end of the yoke 29 and each arm extends rearwardly into the adjacent barrel portion 11 and terminates in an annular ring 31. The outer dimensions of these rings 31 are slightly less than the inner dimensions of the barrel portion and a washer 32 of velvet, felt or the like, is secured on the ring 31 to provide a friction fit between the ring and the barrel portion. A diaphragm plate 33 is carried by the ring 31 and is held in place by a spacing sleeve 34. An ocular 35 is secured at the outer end of each sleeve 34 by a cap 36 and the cap 36, sleeve 34 and diaphragm 33 are secured in position on the ring 31 by bolts 37.

In operation, turning the knob 28 moves the lenses 35 toward and from the objectives 18 to focus the system. The lenses 18 and 35 are of greater width than heighth to provide a wide field of view. In viewing theatrical performances or sporting events, such as games or races, the vertical field is relatively small while the action takes place over a field of much greater width. The shape of the lenses provides such a field of view.

From the foregoing, it will be apparent that I am able to attain the objects of my invention and provide a simple, inexpensive but efficient field glass or binocular constructed mainly of a molded resin or plastic. While I prefer to use a synthetic resin or plastic such as Bakelite or the like, obviously the invention as well contemplates the use of cast or molded metals or die castings. Various modifications can, of course, be made without departing from the spirit of my invention or the scope of the appended claims.

I claim:

1. A field glass comprising a body having two spaced barrel portions and a bridge member integral with and connecting said barrel portions, a pair of oculars, one slidable in each barrel member, a yoke positioned within said body and connecting said oculars, a front plate adapted to fit over said body at the end opposite said oculars, a pair of objectives carried by said front plate, each having its axis aligned with one of said oculars, a rod extending from said bridge member through said yoke to said front plate for securing said front plate to said body and for forming a slide for said yoke, a screw rotatably carried by said bridge member and said front plate and threaded in said yoke, a knurled knob on said screw for actuating said screw to move said yoke for focusing and a member rotatably journalled in the bridge member coaxial with said screw and secured to the inner end of said screw.

2. A field glass comprising a hollow body having two spaced barrel portions, a bridge member formed integrally with said body and extending across one end of said body between said barrel portions, a front plate adapted to close the other end of said hollow body, means on said front plate for holding two objective lenses, one in alignment with the axis of each barrel, a smooth rod extending between said bridge member and said front plate parallel to the axes of said barrels, means for securing said rod to both said bridge and said plate to hold said body and plate in assembled relation, a screw rotatably mounted in said bridge and said plate and extending therebetween with its axis parallel to the axes of said barrels, a member rotatably journalled in said bridge member coaxially with said screw and secured to said screw, a yoke slidably mounted on said rod and threaded on said screw, arms on said yoke extending rearwardly from said yoke, one into each barrel, a friction washer on each arm for engaging said barrels, two oculars, one slidably mounted in the rear end of each barrel, screws extending through said arms and threaded into said oculars for securing said oculars, one on each arm and means for rotating said screw.

OTTO E. TRAUTMANN.